United States Patent
Park et al.

(10) Patent No.: US 8,172,633 B2
(45) Date of Patent: May 8, 2012

(54) FIELD EMISSION DISPLAY AND MANUFACTURING METHOD OF THE SAME HAVING SELECTIVE ARRAY OF ELECTRON EMISSION SOURCE

(75) Inventors: Kyu Chang Park, Seoul (KR); Jin Jang, Seoul (KR); Je Hwang Ryu, Seoul (KR)

(73) Assignee: Industry Academic Cooperation Fundation of Kyunghee University, Yongin (KR)

( * ) Notice: Subject to any disclaimer, the term of this patent is extended or adjusted under 35 U.S.C. 154(b) by 510 days.

(21) Appl. No.: 12/295,943

(22) PCT Filed: Apr. 4, 2007

(86) PCT No.: PCT/KR2007/001656
§ 371 (c)(1),
(2), (4) Date: Dec. 12, 2008

(87) PCT Pub. No.: WO2007/114655
PCT Pub. Date: Oct. 11, 2007

(65) Prior Publication Data
US 2010/0201251 A1    Aug. 12, 2010

(30) Foreign Application Priority Data
Apr. 5, 2006 (KR) .................. 10-2006-0030844
May 18, 2006 (KR) .................. 10-2006-0044794

(51) Int. Cl.
*H01J 9/04* (2006.01)
(52) U.S. Cl. ....... 445/50; 313/336; 313/495; 313/346 R; 313/309
(58) Field of Classification Search .................. None
See application file for complete search history.

(56) References Cited

U.S. PATENT DOCUMENTS

| | | | | |
|---|---|---|---|---|
| 6,472,802 B1* | 10/2002 | Choi et al. | ................ | 313/309 |
| 6,917,147 B2* | 7/2005 | Dijon et al. | ................ | 313/310 |
| 7,413,924 B2* | 8/2008 | Weston et al. | ................ | 438/99 |
| 7,504,768 B2* | 3/2009 | Oh | ................ | 313/497 |
| 7,710,014 B2* | 5/2010 | Lee et al. | ................ | 313/497 |
| 7,785,164 B2* | 8/2010 | Meyer et al. | ................ | 445/24 |
| 7,811,641 B2* | 10/2010 | Jang et al. | ................ | 427/570 |
| 2005/0112983 A1* | 5/2005 | Park | ................ | 445/49 |
| 2007/0099336 A1* | 5/2007 | Weston et al. | ................ | 438/99 |
| 2008/0194168 A1* | 8/2008 | Meyer et al. | ................ | 445/49 |
| 2008/0238285 A1* | 10/2008 | Hong et al. | ................ | 313/309 |
| 2008/0248218 A1* | 10/2008 | Jang et al. | ................ | 427/570 |

FOREIGN PATENT DOCUMENTS

| | | |
|---|---|---|
| JP | 2002-270085 | 9/2002 |
| JP | 2003-249162 | 9/2003 |
| JP | 2006-004643 | 1/2006 |
| KR | 10-1999-0031025 | 5/1999 |

* cited by examiner

*Primary Examiner* — Peter Macchiarolo
(74) *Attorney, Agent, or Firm* — Hahn & Voight PLLC; Roger C. Hahn

(57) ABSTRACT

The present invention relates to a field emission display and a manufacturing method of the same having selective positioning of electron field emitters. More specifically, the present invention provides a field emission display and a manufacturing method of the same having selective positioning of electron field emitters which can prevent a cross-talk that is a mutual interference phenomenon between pixels and improve uniformity of pixels based on uniform electron emission by deciding positions of carbon nano-tubes which are sources of electron emission and growing carbon nano-tubes before the structure of electrodes is formed, and forming spacers directly on electrodes such that the spacers divide carbon nano-tubes formed uniformly and selectively into pixel units.

30 Claims, 9 Drawing Sheets

FIELD EMISSION DISPLAY AND MANUFACTURING METHOD OF THE SAME HAVING SELECTIVE ARRAY OF ELECTRON EMISSION SOURCE

TECHNICAL FIELD

The present invention relates to a field emission display and a manufacturing method of the same having selective positioning of electron field emitters. More specifically, the present invention provides a field emission display and a manufacturing method of the same having selective positioning of electron field emitters which can prevent a cross-talk that is a mutual interference phenomenon between pixels and improve uniformity of pixels based on uniform electron emission by deciding positions of carbon nano-tubes which are sources of electron emission and growing carbon nano-tubes before the structure of electrodes is formed, and forming spacers directly on the electrode such that the spacers divide carbon nano-tubes formed selectively and uniformly into pixel units.

BACKGROUND ART

In general, a field emission display (FED) is based on electron emission in a vacuum. That is, a FED plays a role of display equipment by making electrons impact to anode electrodes coated with florescent substance to emit light, after electrons being emitted from electron emission source which is affected by strong electric field produced by impressing thousands of voltages to anode electrode and applying tens of positive voltages to electron emission source from gate electrode. Nowadays, many researches are being made on a FED as a flat panel display of next generation since the FED has excellent brightness and resolution, together with advantages in its light and thin traits.

Silicon tips or metal tips such as molybdenum and so on are mainly used as the electron emission source of said FED. However, metal tips have problems in that operating voltage of them is very high and leakage current is large due to thermal degradation of the tips resulting from their emitting high currents, and as a result, reliabilities and performances of the elements fall down.

In order to solve the above problems, carbon nano-tubes ("CNT") having superior mechanical and electron emission characteristics as well as electric selectivity, are used as electron emission sources. Carbon nano-tubes are applied to various electric and electronic fields since a carbon nano-tube is a carbon allotrope composed of carbon atoms to constitute a tube form by combining a carbon atom with the other carbon atoms in hexagonal honeycomb pattern.

However, the FED using said electron field emitters has problems in that mutual interferences between pixels are occurred and efficiency of electron emission falls down due to the lack of technologies by which carbon nano-tubes can be formed at the desired locations and arrayed vertically. The emitters for FED which were mainly used in the early developmental stage of said FED had defects in that manufacturing process and structures of them were complicated. Moreover, since the ion beam of high price was needed to use semiconductors and metals as electron emission sources, there was another problem that they could not be applied to the FED.

Further, a conventional FED had spacers installed between anode and cathode substrates to maintain a vacuum gap with a predetermined width ranging from tens of microns to couple of millimeters, prevent an anode substrate and a cathode substrate in a vacuum state from being collapsed by the outside atmospheric pressure, and thereby the spacers play a role of preventing a cross-talk that is a mutual interference phenomenon between pixels in the operation process of elements.

Requirements of said spacers are as follows: That is, they should not be seen visually (50~100 μm in their width, 25:1 or more in their aspect ratio), and they should have physical and chemical durability (required strength for the FED: 14.7 lbs/inch$^2$=1.0 lbs/2.1 inch-diagonal). Moreover, upper and lower substrates should match in the coefficient of thermal expansion and so forth in order to prevent damages by the stress in a thermal process. In addition, their gas separation phenomenon and reactivity on florescent substance should be low. Also, they should have surface conductivity as long as insulation between cathode and anode electrodes is maintained such that electric charge accumulation is prevented, and a production level of secondary electrons should be low in order to prevent electric breakdown.

The above spacers are formed using frit, polyimide, glass structures (cross, pillars, rib, ball, and so forth), ceramic structures, optic fibers, and etc. Above all, glass structures and optic fibers are mainly used in forming the spacers.

DISCLOSURE

Technical Problems

The manufacturing method of electron field emitters using carbon nano-tubes as described above had problems in that their manufacturing process was complicated and it was difficult to form carbon nano-tubes at the desired positions since carbon nano-tubes had to be grown after forming a diffusion barrier layer, a catalyst metal layer, an insulating layer and so forth.

Moreover, there was another problem that it was difficult to manufacture a display of high resolution due to limitations in adjusting the width of spacers when the spacers were manufactured as stated above.

In addition, a Japanese FED manufacturing company, Noritake Co. Ltd., recently presented a manufacturing technology of spacers using very precise glass rib in order to increase brightness and reduce cross-talks between pixels by raising anode voltage together with a predetermined vacuum gap [Junko Yotani, Sashiro Uemura, Takeshi Nagasako, Hiroyuki Kurachi, Hiromu Yamamda, Tomotaka Ezaki, Tsuyoshi Maesoba, Takehiro Nakao, Masaaki Ito, Yahachi Saito, Motoo Yumura SID '04, *Digest of technical paper*, vol. I, 828, (2004)]. However, since very precise and high level technology was required to manufacture and array the above glass ribs, there was still another problem that it was very hard to apply the said ribs to FED.

Therefore, in order to solve the problems described above, it is an object of the present invention to provide a method in which carbon nano-tubes as electron emission sources can be grown selectively and uniformly at the desired positions using photoresist.

Also, it is another object of the present invention to simplify manufacturing process of FED and reduce the cost thereof by forming a catalyst metal layer on a cathode electrode formed in a substrate without forming a diffusion barrier layer, nextly forming a pattern only in the place where electron field emitters are to be formed on said catalyst metal layer using a process of lithography, and then growing carbon nano-tubes as electron field emitters on the pattern.

In addition, it is another object of the present invention to prevent cross-talks between pixels formed on the upper substrate by providing a forming method of spacers in which spacers dividing electron field emitters into pixel units are directly formed over carbon nano-tubes selectively grown using the process of lithography and photoresist.

Further, it is still another object of the present invention to prevent deterioration of characteristics of carbon nano-tubes by removing the resist in the place where carbon nano-tubes as electron field emitters do not need to be grown, and thereby reducing the possibility of secondary reaction due to the residual resist.

Technical Solution

To accomplish these objects, the present invention provides a manufacturing method of FED using selective positioning of electron field emitters, the method comprising: forming a cathode electrode and a catalyst metal layer on a lower substrate; forming a photoresist layer on said catalyst metal layer to form growth areas of electron field emitters such that each of said growth areas has a desired shape of pattern at a desired position, and removing photoresist in the residual area other than said growth areas by a process of lithography; growing electron field emitters in said growth areas formed in said patterns.

Also, the present invention provides another manufacturing method of FED using selective positioning of electron field emitters, the method comprising: forming cathode electrodes and a catalyst metal layer on a lower substrate; forming a photoresist layer on said catalyst metal layer; forming desired patterns at the places where electron field emitters are to be formed on said photoresist layer; forming building holes of electron field emitters by removing said patterns; forming electron field emitters in said building holes of electron field emitters.

In addition, according to another aspect of the present invention, there is provided a FED having a lower substrate with a cathode electrode and electron emission sources, an upper substrate with an anode electrode and pixels, and partitions for maintaining a gap between the upper and lower substrates and shielding inside of them, the FED further comprises spacers for dual use as partitions formed over the lower substrate such that the spacers divide electron field emitters into pixel units.

Advantageous Effects

As described above, the manufacturing method of FED according to the present invention can decide positions of carbon nano-tubes as electron field emitters such that they are easily formed at the desired positions, before the structure of electrodes is set.

Also, the present invention can improve uniformity of pixels based on uniform electron emission by forming spacers which can divide electron field emitters into pixel units using photoresist to prevent cross-talks occurring in the operation process of electron field emitters.

In addition, as stated above, the present invention can realize a FED of big size and a reduction of its production cost at the same time by forming electron field emitters at the desired positions over the lower substrate and using spacers dividing the electron field emitters into pixel units.

Further, the present invention can simplify the manufacturing process of FED to reduce the cost thereof by forming carbon nano-tubes as electron field emitters without a diffusion barrier layer.

Also, after forming the desired patterns over a catalytic metal layer by the process of lithography using photoresist, the present invention can form electron field emitters in the desired shapes at the desired positions by growing carbon nano-tubes as electron field emitters on said patterns.

In addition, the present invention can prevent deterioration of characteristics of carbon nano-tubes, by removing the resist in the place where carbon nano-tubes as electron field emitters are not needed to be grown and thereby reducing the possibility of secondary reaction due to the residual resist.

BEST MODES OF THE INVENTION

The present invention will now be described more fully with reference to the accompanying drawings, in which exemplary embodiments of the invention are shown.

Figure 1:
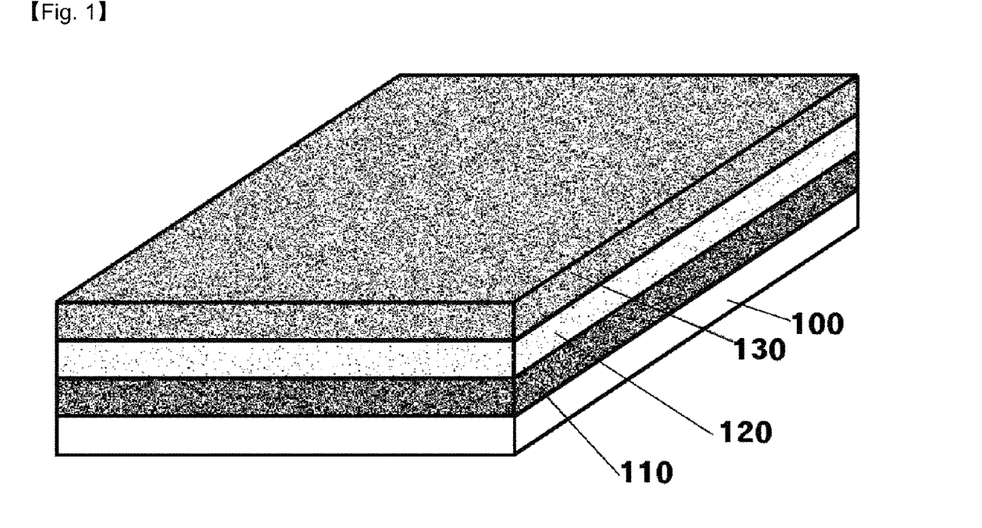
FIGS. 1 through 3 are diagrams sequentially showing the process of forming electron field emitters by their selective positioning according to an embodiment of the present invention.
Figure 2:
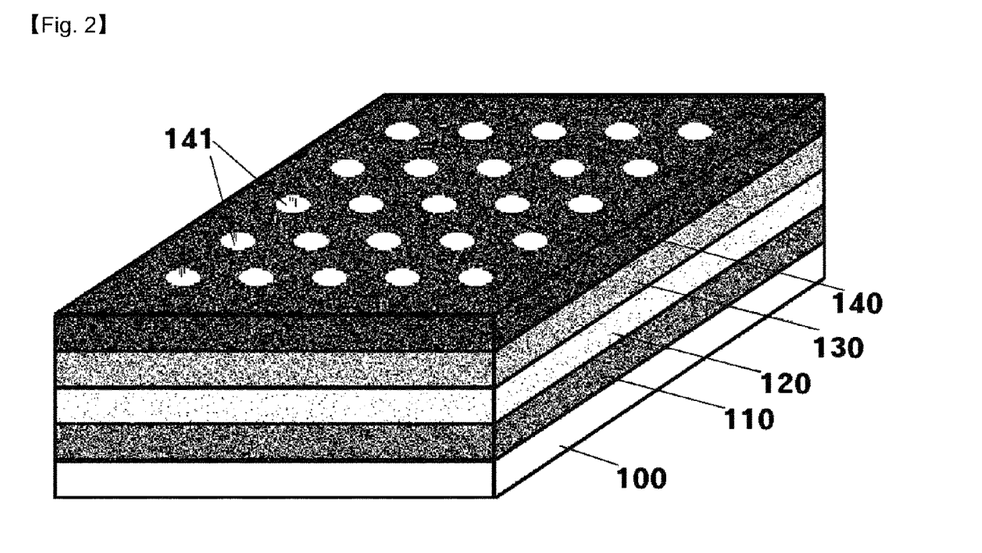
Figure 3:
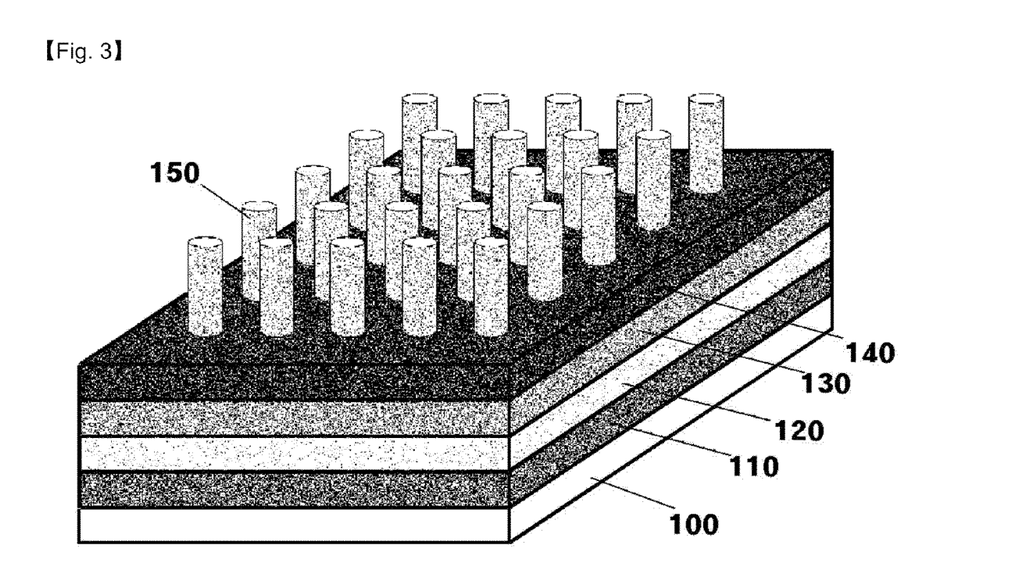

In the first place, FIGS. 1 through 3 are diagrams sequentially showing the forming method of electron field emitters by selectively growing carbon nano-tubes as electron emission sources at the desired positions using photoresist in the process of lithography, according to an embodiment of the present invention in the manufacturing method of FED.

Firstly, as shown in FIG. 1, a cathode electrode (110) having a predetermined pattern is formed on a substrate (100) which is composed of one of glass, quartz, silicon or alumina ($Al_2O_3$), and then a diffusion barrier layer (120) is formed on said cathode electrode (110) using titanium (Ti) or titanium alloy (Ti-alloy) which is made by mixing titanium with tungsten (W), and etc. Next, a catalyst metal layer (130) is formed on said diffusion barrier layer (120). At this time, the above diffusion barrier layer (120) is formed with a thickness of 5~20 nm, and it plays a role of preventing said catalyst metal layer (130) from diffusing into the substrate (100). However, the above diffusion barrier layer (120) may be omitted in some cases.

Also, the above catalyst metal layer (130) is formed with a thickness of several nm to hundreds of nm, preferably from 3 nm to 30 nm, by a lift-off method, a thermal evaporation method, a sputtering method, an electron beam evaporation method or a chemical vapor deposition method and so forth, using one of mono metals such as nickel (Ni), iron (Fe), cobalt (Co), or alloys such as cobalt-nickel, cobalt-iron, nickel-iron or cobalt-nickel-iron.

Also, as another method of forming the catalyst metal layer (130), a process of lithography may be used. In the process of lithography, a catalyst metal layer of a desired pattern is formed by the following steps: firstly spreading a catalyst metal layer over the whole surface of a substrate; spreading photoresist on said catalyst metal layer; and then exposing the photoresist to light through the desired pattern.

Next, FIG. 2 is a diagram illustrating that a photoresist layer having a pattern for selectively growing carbon nano-tubes as electron field emitters is formed on the above catalyst metal layer. The photoresist layer (140) is formed by a spin coating over the lower substrate (100) on which a diffusion barrier layer (120) and a catalyst metal layer (130) are formed respectively. At this time, the photoresist layer is formed with a thickness of 0.3~10 μm by controlling the speed of spin coating. Also, the photoresist formed with the above thickness is developed through carrying out a process of light exposure in a desired pattern using UV and a photo-mask, after said photoresist is sintered at a temperature of 100-250° C. Next, building holes of electron field emitters (141) are formed by imposing chemical modification on the non-light exposed area of the photoresist layer through its melting process at a temperature of 600° C. for 30 minutes. At this time, the above building holes of electron field emitters (141) may have various forms according to the pixel areas formed in the upper substrate of FED.

Next, FIG. 3 is a diagram showing that carbon nano-tubes (150) are grown on the parts of catalyst metal layer (130) which are exposed by building holes of electron field emitters (141) formed in the photoresist layer as shown in FIG. 2. On the other hand, carbon nano-tubes do not grow on the place where photoresist (140) exists.

The above carbon nano-tubes (150) are formed by annealing the substrate (100) in the plasma reactor having an internal temperature of 150~800° C. and an internal pressure of 2 Torr, and then supplying it with hydrocarbon gas such as methane ($CH_4$), ethylene ($C_2H_2$), propylene ($C_2H_6$) or propane ($C_3H_8$), together with gas containing nitrogen or hydrogen such as ammonia ($NH_3$) or other hydride gases. According to an embodiment of the above method of forming carbon nano-tubes, 30 sccm of ethylene and 70 sccm of ammonia are supplied at the same time, under the circumstances that the voltages of upper and lower electrodes are being fixed at 0 V and −600V, respectively, and the voltage of mesh electrode is being supplied with +300V.

Hydrocarbon gas such as methane, ethylene, propylene or propane, which is supplied into a deposition room of a plasma equipment for chemical vapor deposition (PECVD) as described above, is dissociated into carbon units (C═C or C) and free hydrogen (H) in the states of gases by plasma or heat decomposition (pyrolysis). Then, the dissociated carbon units are deposited on the surfaces of metal particles of the catalytic metal layer (130) exposed by the building holes of electron field emitters (141) formed in the photoresist layer (140), and they diffuse to be dissolved into the particles of the catalytic metal as time goes by. In case carbon units are continuously furnished under the conditions state above, carbon nano-tubes as electron field emitters (150) are grown in a predetermined direction by catalytic actions of particles of catalytic metal. Further, in case the shapes of catalyst metal particles are round or blunt, the end shapes of carbon nano-tubes are also formed round or blunt, and in case the ends of catalyst metal particles are sharp, the end shapes of carbon nano-tubes are formed sharp as well.

Figure 4:
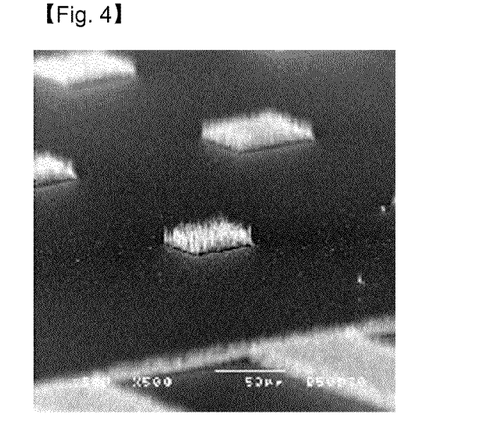
FIGS. 4 and 5 are photographs showing selectively grown carbon nano-tubes according to an embodiment of the present invention as shown in FIGS. 1 through 3.
Figure 5:
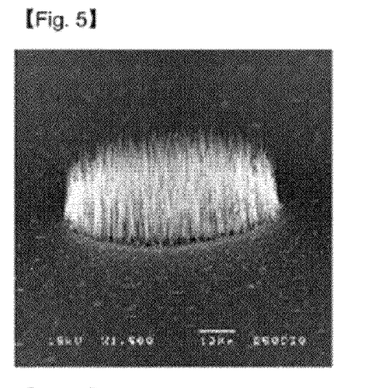

Next, FIGS. 4 and 5 are photographs showing that carbon nano-tubes as electron field emitters are formed over the lower substrate in the same method as shown in FIGS. 1 through 3. FIG. 4 is a photograph showing that carbon nano-tubes are formed in quadrangular forms in case the pattern shapes developed on the photoresist are quadrangular, and FIG. 5 is a photograph showing that carbon nano-tubes are formed in a circular form in case the pattern shape developed on the photoresist is circular.

Also, FIGS. 6 through 9 are the diagrams sequentially showing another method of forming electron field emitters by selectively growing carbon nano-tubes as electron emission sources at the desired positions, according to another embodiment of the present invention in the manufacturing method of FED.

Figure 6:
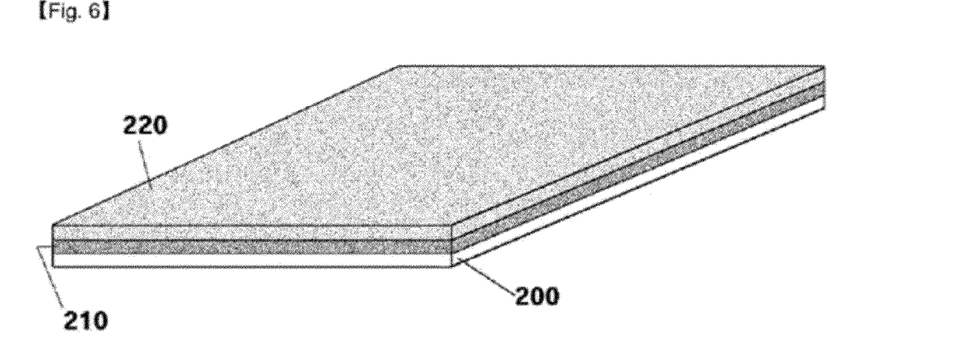
FIGS. 6 through 9 are diagrams sequentially showing the process of forming electron field emitters by their selective positioning according to another embodiment of the present invention.

First, as shown in FIG. 6, a cathode electrode (210) having a predetermined pattern is formed on a substrate (200) which is composed of glass, quartz, silicon (silicon wafer) or alumina ($Al_2O_3$), and a catalyst metal layer (220) is formed on said cathode electrode (210) using a process of vacuum deposition.

The above catalyst metal layer (220) is formed with a thickness of several nm to hundreds of nm, preferably from 10 nm to 100 nm, by using a lift-off method, a thermal evaporation method, a sputtering method, an electron beam evaporation method or a chemical vapor deposition method and so forth, using one of mono metals such as nickel (Ni), iron (Fe) or cobalt (Co), or alloys such as cobalt-nickel, cobalt-iron, nickel-iron or cobalt-nickel-iron.

Also, as another method of forming the catalyst metal layer (220), a process of lithography may be used. In the process of lithography, a catalyst metal layer of a desired pattern is formed by the following steps: firstly spreading a catalyst metal layer over the whole surface of a substrate; spreading photoresist on said catalyst metal layer; and then exposing the photoresist to light through the desired pattern.

Figure 7:
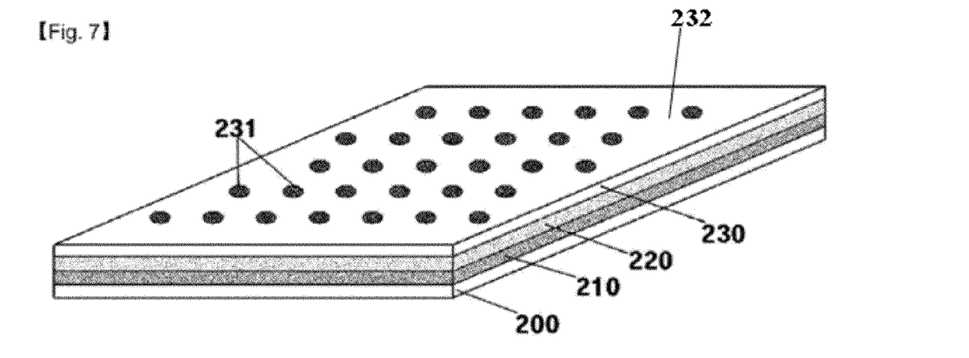

Next, FIG. 7 is a diagram illustrating that a photoresist layer having a pattern for selectively growing carbon nano-tubes as electron field emitters is formed on the above catalyst metal layer. The photoresist layer (230) is formed by a spin coating over the lower substrate (200) on which the catalyst metal layer (230) is formed. At this time, the photoresist layer is formed with a thickness of 0.3~10 μm by controlling the speed of spin coating. In addition, the photoresist formed with the above thickness is developed through carrying out a process of light exposure in a desired pattern using UV and a photo-mask, after said photoresist is sintered at a temperature of 100-250° C., and thereby growth areas of electron field emitters (231) are formed by the pattern at the positions where electron field emitters are to be formed.

Figure 8:
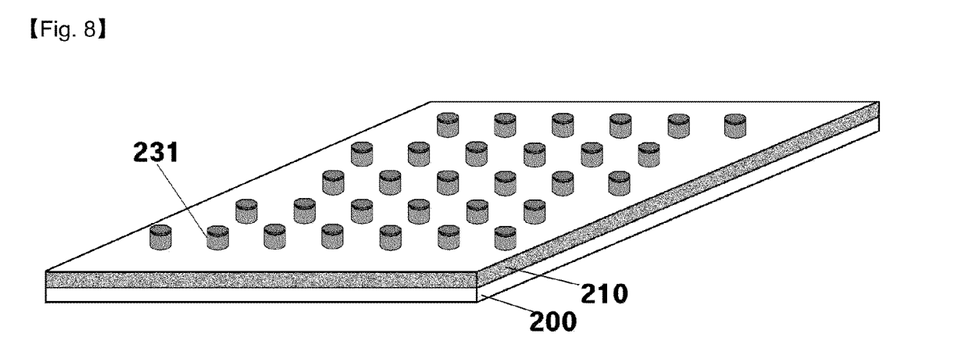

Next, FIG. 8 is a diagram showing a state in which the other parts or residual area (232) of the photoresist layer (230) and the catalytic metal layer (220) are removed except the growth areas of electron field emitters (231) as shown in FIG. 7. The growth areas of electron field emitters (231) as seeds for selectively growing carbon nano-tubes are formed by removing the other parts of lower catalytic layer using etchant, or processing the substrates from which only the other parts of the photoresist layer are removed through a melting process at a temperature of 200~800° C. for 1~600 minutes. That is, the photoresist in the place where carbon nano-tubes as electron field emitters are not to be formed is removed, and the photoresist in the areas where carbon nano-tubes are to be formed is made to react on the catalytic metal. At this time, as for the heat treatment conditions of the above substrates, it is suitable to carry out the melting process at a temperature of 600° C. for 30 minutes.

In addition, the above growth areas of electron field emitters (231) may be formed in various shapes and patterns according to the regions of pixels formed on the upper substrate of FED, and may be selectively formed at the desired positions.

At this time, one of inorganic resist, organic resist, organic-inorganic compound resist, and photo sensitive glass paste is used as resist for forming the above photoresist layer (230).

Figure 9:
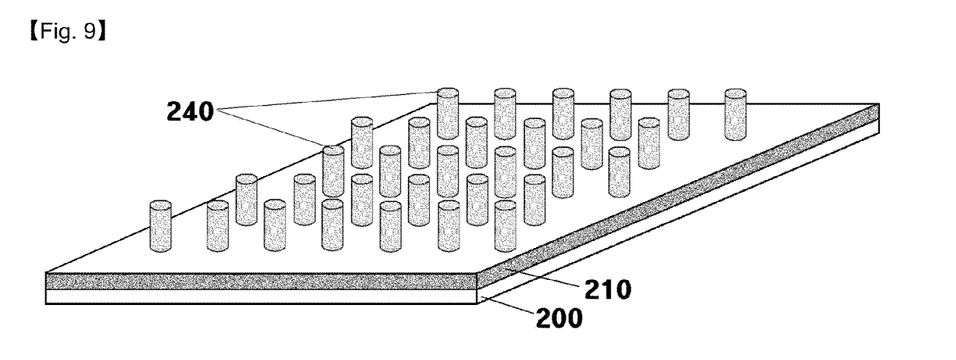

Next, FIG. 9 is a diagram illustrating that carbon nano-tubes are formed in the growth areas of electron field emitters (231) shown in FIG. 8. It becomes impossible to grow carbon nano-tubes in the places lacking the growth areas of electron field emitters (231) which correspond to photoresist pattern, since the catalytic metal in said places diffuses into the cathode electrode and the substrates. Accordingly, carbon nano-tubes as electron field emitters can be grown without the diffusion of the catalytic metal layer only in case where the photoresist constituting the growth areas of electron field emitters exists over the catalytic metal layer. In addition, the growth areas of electron field emitters disappear through reaction in the growing process of electron field emitters.

The above carbon nano-tubes are formed by annealing the substrate (200) in the plasma reactor having an internal temperature of 150~800° C. and an internal pressure of 2 Torr, and then supplying it with hydrocarbon gas such as methane ($CH_4$), ethylene ($C_2H_2$), propylene ($C_2H_6$) or propane ($C_3H_8$), together with gas containing nitrogen or hydrogen such as ammonia ($NH_3$) or other hydride gases. According to an embodiment of the above method of forming carbon nano-tubes, 30 sccm of ethylene and 70 sccm of ammonia are supplied at the same time, under the circumstances that the voltages of upper and lower electrodes are being fixed at 0 V and −600V, respectively, and the voltage of mesh electrode is being supplied with +300V.

Hydrocarbon gas such as methane, ethylene, propylene or propane, which is supplied into a deposition room of a plasma equipment for chemical vapor deposition (PECVD) as described above, is dissociated into carbon units (C═C or C) and free hydrogens (H) in the states of gases by plasma or heat decomposition (pyrolysis). Then, the dissociated carbon units are deposited on the surfaces of the growth areas of electron field emitters (231) built on the cathode electrode (210), and they diffuse to be dissolved into the particles of the catalytic metal as time goes by. In case carbon units are continuously furnished under the conditions stated above, carbon nano-tubes as electron field emitters are formed by catalytic action of particles of catalytic metal.

Figure 10:
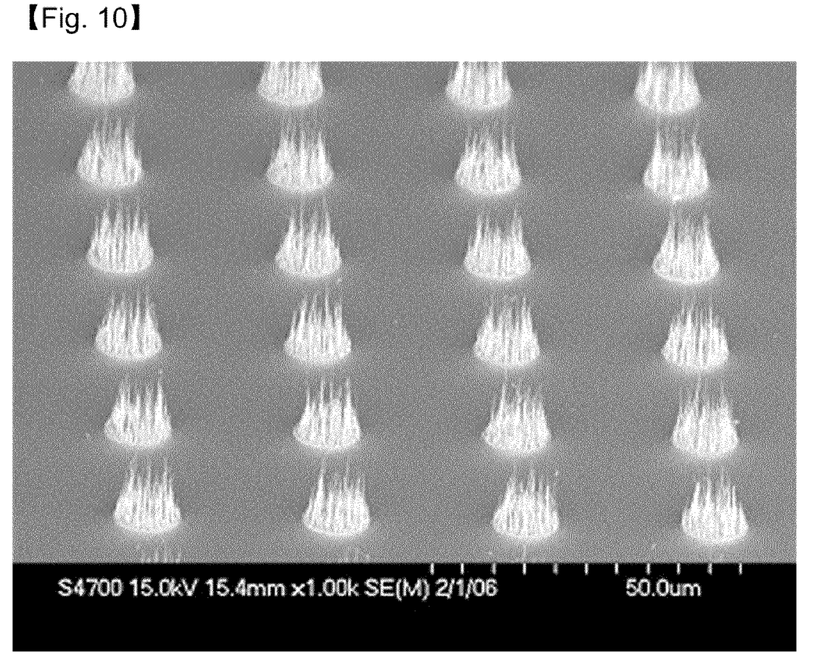
FIGS. 10 and 11 are photographs showing selectively grown carbon nano-tubes according to another embodiment of the present invention as shown in FIGS. 6 through 9.
Figure 11:
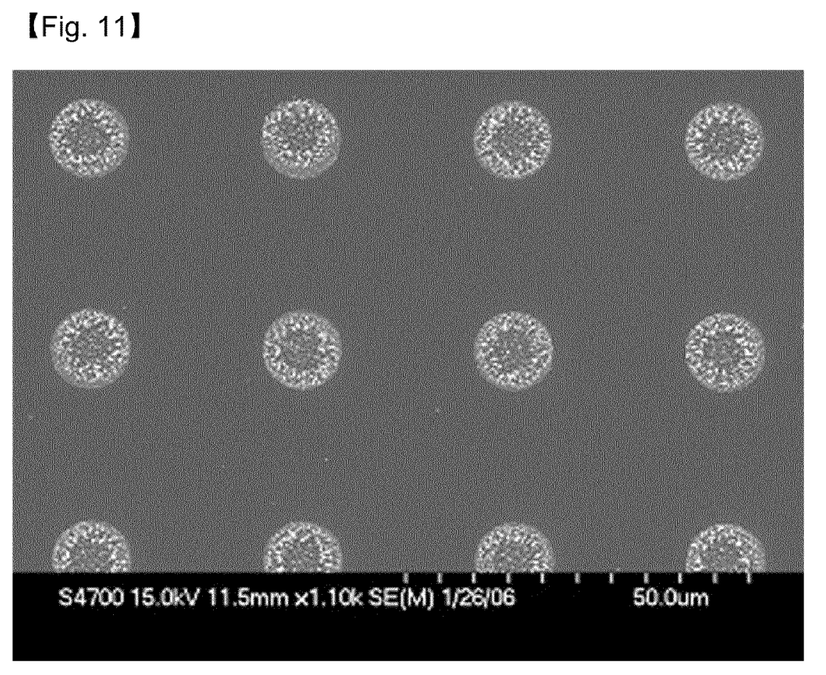

Next, FIGS. 10 and 11 are photographs showing that carbon nano-tubes as electron field emitters are formed over the lower substrate in the same method as shown in FIGS. 6 through 9. That is, they are pictures of a side view and a plane view respectively, showing the state in which carbon nano-tubes are formed in circular forms on the growth areas of electron field emitters, in case the shapes of said growth areas formed using the photoresist on the above catalytic metal layer are circular, and regular gaps between the growth areas are maintained.

Figure 12:
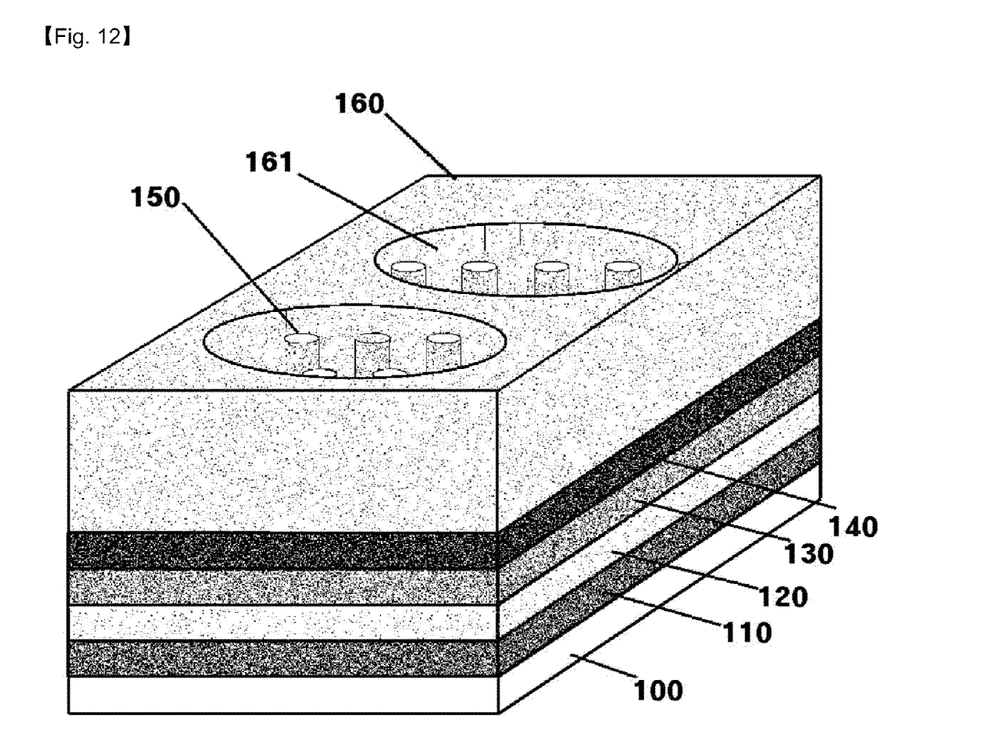
FIG. 12 is a diagram illustrating spacers for dividing electron field emitters into pixel units formed over the lower substrate of FED, in which electron field emitters are formed by their selective positioning according to an embodiment of the present invention.

Next, FIG. 12 is a diagram showing that spacers dividing the electron field emitters (150) into pixel units formed on the upper substrate are built over the lower substrate having said electron field emitters formed in the same method as shown in FIGS. 1 through 3, according to an embodiment of the present invention. Using one of organic resist, inorganic resist and organic-inorganic compound resist, a resist layer having an insulation characteristic is made over an array equipped with the electron field emitters formed as shown in FIG. 3, with a predetermined height in consideration of the gap with the upper substrate. The resist layer is used to form spacers for separation of each pixel and maintaining the cell gap.

Next, the sintered resist corresponding to the regions of pixels (161) formed on the upper substrate is removed using the developer or etchant, and the resist of the other regions is left as it is to maintain the cell gap. At this time, the thickness of the resist layer may be variously formed according to the structure of electrodes, and one of inorganic resist, organic resist, organic-inorganic compound resist and photo sensitive glass paste may be used for the above resist layer.

Moreover, though it is not shown separately in the drawings, spacers may be formed in the same manner as described above even over the lower substrate on which the electron field emitters (240) are formed as shown in FIG. 9.

As described above, by forming the spacers dividing the electron field emitters formed over the lower substrate into pixel units using the resist patterning, the present invention can use the spacers as partitions without making separate partitions, and induce the directions of electrons emitted from the electron field emitters only to the corresponding pixels, such that the cross-talk phenomenon caused by mutual interference between pixels due to electrons emitted from the other electron field emitters is prevented.

Next, FIGS. 13 through 18 are drawings for illustrating a manufacturing process of FED in order, using the method of forming electron field emitters based on their selective positioning and the forming method of spacers dividing electron field emitters into pixel units.

Figure 13:
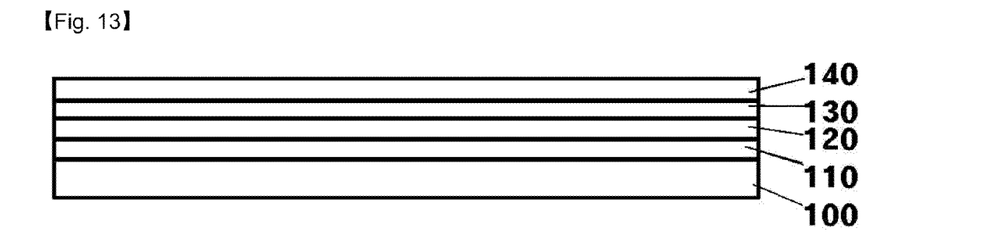
FIGS. 13 through 18 are diagrams sequentially showing a manufacturing process of FED by the selective positioning of electron field emitters and the forming method of spacers dividing electron field emitters into pixel units according to an embodiment of the present invention.

First, as shown in FIG. 13, a number of cathode electrodes (110) having a predetermined pattern like stripes type are formed in one direction with regular gaps on the lower substrate (100) of a predetermined size. Then, a diffusion barrier layer (120), a catalytic metal layer (130), and a photoresist layer (140) are formed in order over said cathode electrodes (110). At this time, both the diffusion barrier layer (120) and the catalytic metal layer (130) have the same pattern as that of cathode electrodes (110), and the photoresist layer (140) is formed with a thickness of 0.3~10 μm, using the spin coating.

Figure 14:
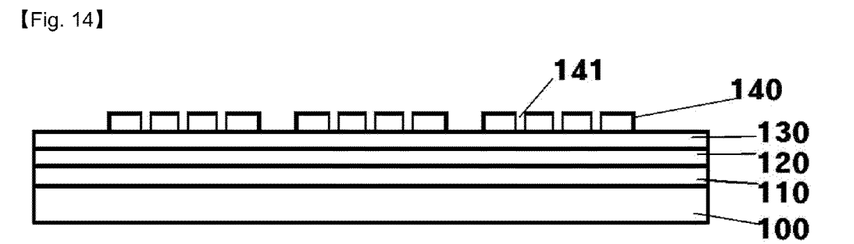

Next, as shown in FIG. 14, building holes of electron field emitters (141) are made by the following steps: sintering the photoresist layer (140) formed as shown in FIG. 13 at a temperature of 100~250° C.; carrying out a process of light exposure on the photoresist layer for patterning in needed shapes using UV and a photo-mask; exposing parts of catalytic metal layer (130) by developing the photoresist layer and removing the pattern of light-exposed area; and lastly melting it at a temperature of 600° C. for 30 minutes. At this time, the building holes of electron field emitters (141) may be variously formed according to the shapes of pattern formed on the photoresist layer (140), and preferably are formed in compliance with the regions of pixels formed on the upper substrate of FED.

Figure 15:
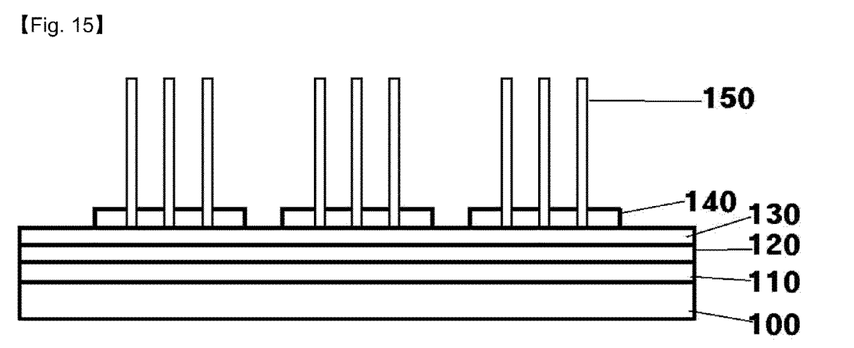

Next, FIG. 15 is a diagram showing that carbon nano-tubes as electron field emitters are formed in the building holes of electron field emitters (141) made in the photoresist layer (140) over the lower substrate as shown in FIG. 14. The above carbon nano-tubes are formed using a plasma chemical vapor deposition method or a thermal chemical vapor deposition method.

Figure 16:
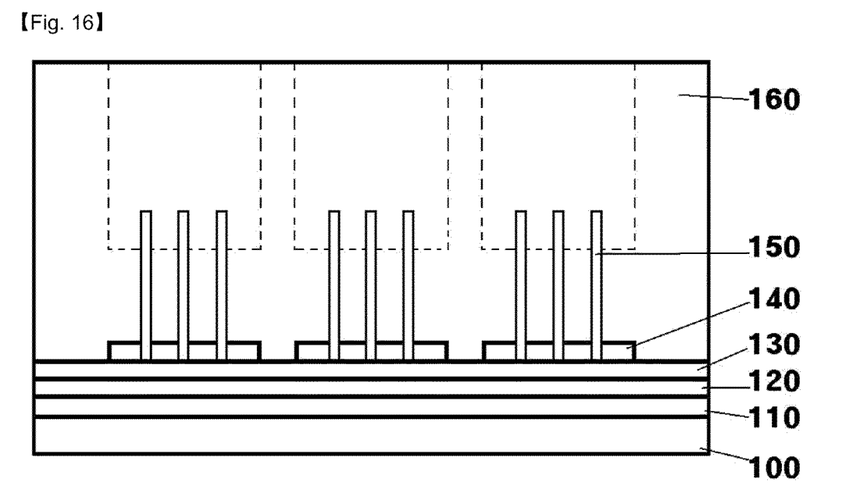
Figure 17:
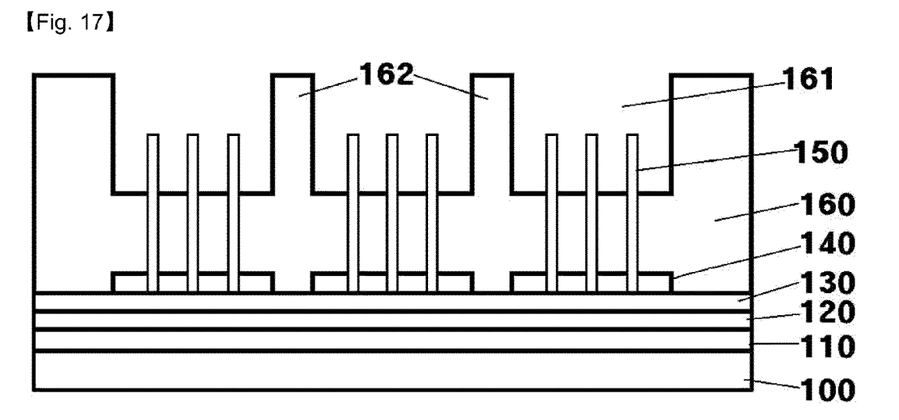

Next, FIGS. 16 and 17 are diagrams illustrating that the resist (160) for forming spacers is stacked over the lower substrate having electron field emitters as shown in FIG. 15. The resist (160) is spread over the carbon nano-tubes so that the carbon nano-tubes sink into the resist, and it is formed with a predetermined height in consideration of a gap between the upper and the lower substrates, in the method of screen printing, chemical vapor deposition or spin coating. Next, the spacers (162) dividing electron field emitters into pixel units are formed by sintering the resist at a temperature of 100~600° C. which is higher than the sintering temperature of the photoresist layer (140), and removing the resist in the regions corresponding to each pixel (161) formed on the upper substrate using the developer, before sintering it.

In addition, as a method of removing the resist in the regions corresponding to the above stated pixels, it is possible to select one among the methods of opening separately every region of selectively grown carbon nano-tubes, opening one pixel after dividing it into a number of parts, and opening the total region of pixel areas. That is, spacers may be formed in all areas except the region of carbon nano-tubes as electron field emitters, the regions where one pixel is divided into a number of parts, or the total region of pixel areas. Moreover, spacers in the edge area excluding the regions of pixels are made thick to be used as partitions.

Figure 18:
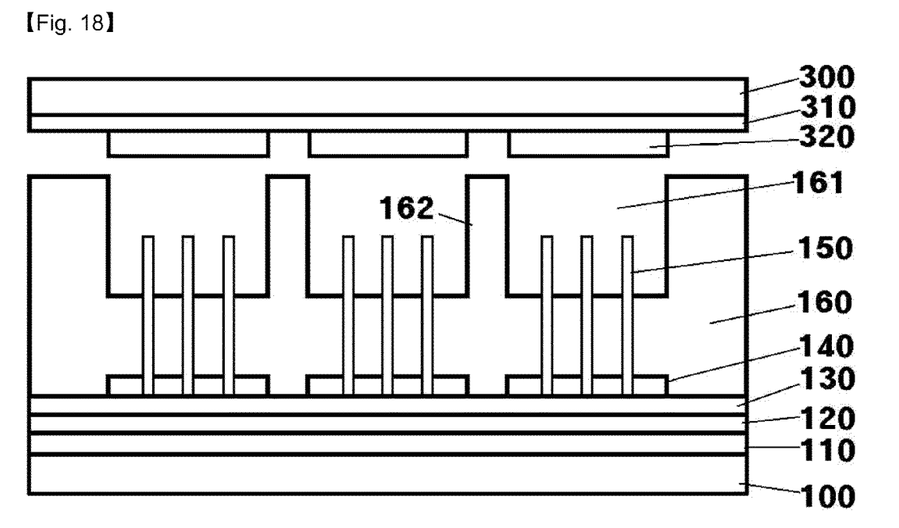

Next, FIG. 18 is a diagram illustrating a FED manufactured by an embodiment of the present invention. It is manufactured by installing the upper substrate (300), in which anode electrode (310) and pixels (320) are formed, on the lower substrate (100) in which electron field emitters (150) and spacers (162) dividing the region of pixels (161) are formed as shown in FIG. 17, and then sealing up the upper and lower substrates to be packed in a vacuum.

The upper substrate (300) is made of transparent glass and so forth, and transparent electrodes such as ITO (Indium Tin Oxide) and so on are formed as anode electrodes (310) on a side of said upper substrate. Next, pixels (320) are formed using florescent substances emitting red, blue and green lights on the anode electrodes (310).

In addition, a FED may be manufactured by forming electron field emitters over a lower substrate in the method as shown in FIGS. 6 through 9, instead of the method of forming electron field emitters over a lower substrate as shown in FIGS. 13 through 16, and applying sequentially the method as shown in FIGS. 16 through 18.

In the FED manufactured as described above in detail, when an electric field is applied between cathode and anode electrodes, electrons are emitted from electron field emitters composed of vertically grown carbon nano-tubes, and red, blue and green lights are released by impinging of the emitted electrons upon pixels. At this time, cross-talks can be prevented since the above electrons emitted to the region of pixels are induced only to the corresponding pixels due to the spacers for division of pixel unit.

Figure 19:
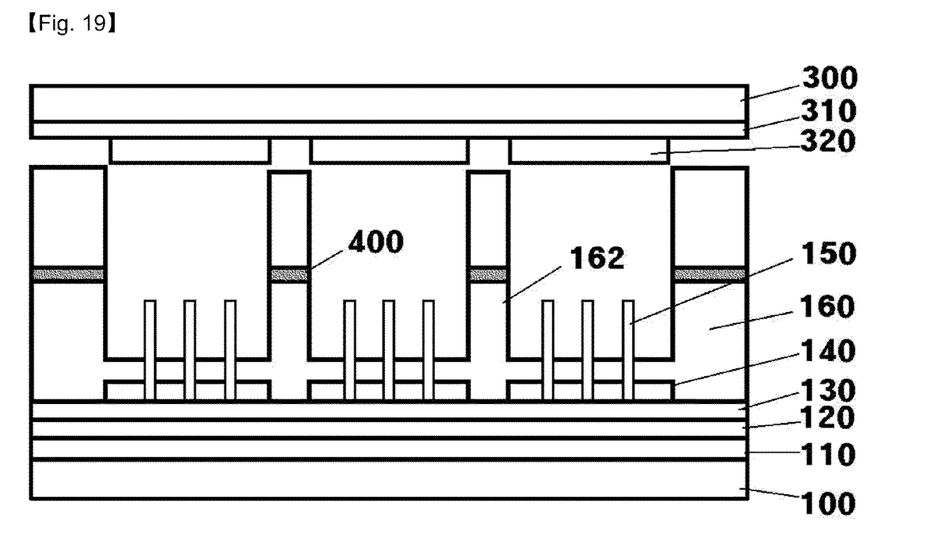
FIG. 19 is a diagram illustrating an example of FED manufactured by the selective positioning of electron field emitters and the forming method of spacers dividing electron field emitters into pixel units according to another embodiment of the present invention.

Next, FIG. 19 is a diagram illustrating a FED manufactured according to another embodiment of the present invention. It is manufactured by installing the upper substrate (300) in which anode electrodes (310) and pixels (320) are formed, on the lower substrate (100) in which electron field emitters (150) and spacers (162) dividing the electron field emitters and the regions of pixels are formed as shown in FIG. 18. However, gate electrodes (400) are additionally formed in the middle of the above spacers dividing the regions of pixels before installing the upper substrate (300). The method of forming gate electrodes (400) in the middle of spacers as stated above comprises the following steps: forming resist with a predetermined height over a lower substrate in which electron field emitters (150) are formed; forming a metal layer to be used as gate electrodes on the resist; forming a resist layer again on the metal layer; and then forming spacers for division of pixel regions which include gate electrodes.

The FED manufactured as stated above is a triode-type electron emission display having cathode, anode and gate electrodes, in which electrons can easily impinge on the pixels to emit lights due to the electric field applied between gate and cathode electrodes. Therefore, it is possible to use lower voltage than that of a diode-type electron emission display.

The invention claimed is:

1. A manufacturing method of field emission display using selective positioning of electron field emitters, the method comprising:
    forming a cathode electrode and a catalyst metal layer on a lower substrate;
    forming a photoresist layer on said catalyst metal layer to form growth areas of electron field emitters such that each of said growth areas has a desired shape of pattern at a desired position, and removing the photoresist in a residual area of the photoresist layer other than said growth areas; and
    growing the electron field emitters in said growth areas of electron field emitters formed in said patterns.

2. The method of claim 1, wherein the lower substrate used in the step of forming said catalyst metal layer is one of a glass substrate, a silicon substrate (silicon wafer), and an alumina ($Al_2O_3$) substrate.

3. The method of claim 1, further comprising a step of removing a residual area of the catalyst metal layer other than the growth areas of electron field emitters by etching, after removing said photoresist.

4. The method of claim 1, wherein in the step of forming said catalyst metal layer, said catalyst metal layer is formed using one of transition metals such as nickel (Ni), iron (Fe), and cobalt (Co) or one of alloys such as Co—Ni, Co—Fe, Ni—Fe and Co—Ni—Fe.

5. The method of claim 1, wherein in the step of forming the catalyst metal layer, said catalyst metal layer is formed with a thickness of couple of nm to hundreds of nm, preferably from 10 nm to 100 nm, using one of the methods of thermal evaporation, sputtering, electron beam evaporation, and chemical vapor deposition.

6. The method of claim 1, wherein in the step of forming said photoresist layer, said photoresist layer is formed with a thickness of 0.3 μm to 10 μm by a method of spin coating or slit coating.

7. The method of claim 6, wherein in the step of forming of said photoresist layer, a resist used for forming said photoresist layer is formed by using one of an inorganic resist, an organic resist, an organic-inorganic compound resist, and a photo sensitive glass paste.

8. The method of claim 1, wherein a method of forming said growth areas of electron field emitters comprises:
    sintering said photoresist layer at a temperature of 100~250° C.;
    after carrying out a process of light exposure on said sintered photoresist layer in a desired pattern using UV and a photo-mask, developing said photoresist layer and then removing the photoresist layer in the residual area of the photoresist layer other than the patterned growth areas of electron field emitters; and
    forming the growth areas of electron field emitters as seeds for growing carbon nano-tubes, by melting said sintered photoresist layer in the growth areas of electron field emitters formed in said patterns and said catalyst metal layer for 1~600 minutes in the state that the temperature of the substrates is maintained at 200~800° C.

9. The method of claim 8, wherein in the step of forming the growth areas of electron field emitters, heat treatment time of said substrates decreases as a temperature of heat treatment increases.

10. The method of claim 1, wherein in the step of growing the electron field emitters, said electron field emitters are grown using carbon nano-tubes.

11. The method of claim 10, wherein a method of growing said carbon nano-tubes comprises:
    annealing (heat treatment) said lower substrate; and
    carrying out a plasma chemical vapor deposition process while supplying said annealed lower substrate with hydrocarbon gas.

12. The method of claim 1, further comprising:
    after forming said electron field emitters, spreading a resist layer such that said electron field emitters sink into the resist layer;
    forming a patterned area to remove the resist layer in the areas corresponding to regions of pixels such that said electron field emitters are divided into pixel units in said resist layer; and
    removing said patterned area of the resist layer to expose said electron field emitters, and thereby spacers which divide said electron field emitters into the pixel units are formed automatically.

13. The method of claim 12, wherein in the step of forming said resist layer, said resist layer is formed using one of an inorganic resist, an organic resist, an organic-inorganic compound resist, and a photo sensitive glass paste.

14. The method of claim 12, wherein after forming the patterned area in said resist layer, the method further comprises the step of sintering said resist layer at 100~600° C.

15. The method of claim 12, wherein a method of removing the patterned area of said resist layer is one of a method using a developer, a method of dry etching, and a method of wet etching.

16. The method of claim 12, wherein a method of forming the patterned area to remove the resist layer in the areas corresponding to the regions of pixels is one among a method of opening separately every region where a carbon nano-tube is selectively grown, a method of opening one pixel after dividing it into a number of parts, and a method of opening total region of the pixel areas.

17. A manufacturing method of field emission display using selective positioning of electron field emitters, the method comprising:
    forming cathode electrodes and a catalyst metal layer on a lower substrate;
    forming a photoresist layer on said catalyst metal layer;
    forming a desired pattern on said photoresist layer at the places where the electron field emitters are to be formed;
    forming building holes of electron field emitters by removing the photoresist layer at the places where electron field emitters are to be formed in said pattern; and
    forming the electron field emitters in said building holes of electron field emitters.

18. The method of claim 17, wherein in the step of forming said photoresist layer, said photoresist layer is formed with a thickness of 0.01~10 μm by a spin coating.

19. The method of claim 17, wherein after forming the desired pattern in said photoresist layer, said photoresist layer is sintered through heat treatment at a high temperature of 100~250° C.

20. The method of claim 17, wherein in said step of growing said electron field emitters, said electron field emitters are grown using carbon nano-tubes.

21. The method of claim 20, wherein a method of growing said carbon nano-tubes comprises:
    annealing said lower substrate; and
    carrying out a plasma chemical vapor deposition while supplying said annealed lower substrate with hydrocarbon gas.

22. The method of claim 17, further comprising:
    after forming said electron field emitters, spreading a resist layer such that said electron field emitters sink into the resist layer;
    forming a patterned area to remove the resist layer in the areas corresponding to regions of pixels such that said electron field emitters are divided into pixel units in said resist layer; and
    removing said patterned area of the resist layer to expose said electron field emitters, and thereby spacers which divide said electron field emitters into the pixel units are formed automatically.

23. The method of claim 22, wherein in the step of forming said resist layer, said resist layer is formed using one of an inorganic resist, an organic resist, an organic-inorganic compound resist, and a photo sensitive glass paste.

24. The method of claim 22, wherein after forming the patterned area in said resist layer, the method further comprises the step of sintering said resist layer at 100~600° C.

25. The method of claim 22, wherein a method of removing the patterned area of said resist layer is one of a method using a developer, a method of dry etching, and a method of wet etching.

26. The method of claim 22, wherein a method of forming a patterned area to remove the resist layer in the areas corresponding to the regions of pixels is one among a method of opening separately every region where a carbon nano-tube is selectively grown, a method of opening one pixel after dividing it into a number of parts, and a method of opening a total region of pixel areas.

27. A field emission display having a lower substrate with a cathode electrode and electron emission sources, an upper substrate with an anode electrode and pixel units, and partitions for maintaining a gap between the upper and the lower substrates and shielding inside of them, and the field emission display further comprises spacers for dual use as partitions dividing electron field emitters into the pixel units formed over the lower substrate
    wherein the field emission display is formed by a method comprising:
    forming the cathode electrode and a catalyst metal layer on the lower substrate;
    forming a photoresist layer on said catalyst metal layer to form growth areas of electron field emitters such that each of said growth areas has a desired shape of pattern at a desired position, and removing the photoresist in a residual area of the photoresist layer other than said growth areas; and
    growing the electron field emitters in said growth areas of electron field emitters formed in said patterns.

28. A field emission display of claim 27, wherein the method for forming the field emission display further comprises:
    after forming said electron field emitters, spreading a resist layer such that said electron field emitters sink into the resist layer;
    forming a patterned area to remove the resist layer in the areas corresponding to regions of pixels such that said electron field emitters are divided into the pixel units in said resist layer; and removing said patterned area of the photoresist layer to expose said electron field emitters, and thereby the spacers which divide said electron field emitters into the pixel units are formed automatically.

29. A field emission display of claim 27, wherein said spacers are formed in the areas other than the regions of carbon nano-tubes as electron emission sources, the regions where one pixel is divided into a number of parts, or a total region of pixel areas.

30. A field emission display of claim 27, wherein gate electrodes are additionally formed in middles of said spacers.

* * * * *